United States Patent
M et al.

(10) Patent No.: US 12,517,930 B2
(45) Date of Patent: Jan. 6, 2026

(54) METHOD AND SYSTEM FOR IDENTIFYING MICROSERVICES IN A MONOLITH APPLICATION

(71) Applicant: HCL Technologies Limited, New Delhi (IN)

(72) Inventors: Hareendran M, Chennai (IN); Maheswari V. S, Chennai (IN); Rakesh Agrawala, Noida (IN)

(73) Assignee: HCL Technologies Limited, New Delhi (IN)

( * ) Notice: Subject to any disclaimer, the term of this patent is extended or adjusted under 35 U.S.C. 154(b) by 233 days.

(21) Appl. No.: 18/509,345

(22) Filed: Nov. 15, 2023

(65) Prior Publication Data

US 2024/0168725 A1    May 23, 2024

(30) Foreign Application Priority Data

Nov. 17, 2022   (IN) .............................. 202211065959

(51) Int. Cl.
| | |
|---|---|
| *G06F 8/35* | (2018.01) |
| *G06F 8/20* | (2018.01) |
| *G06F 8/36* | (2018.01) |
| *G06F 8/75* | (2018.01) |

(Continued)

(52) U.S. Cl.
CPC .............. *G06F 16/288* (2019.01); *G06F 8/20* (2013.01); *G06F 8/36* (2013.01); *G06F 8/75* (2013.01); *G06F 16/2379* (2019.01)

(58) Field of Classification Search
CPC ...... G06F 16/288; G06F 16/2379; G06F 8/36; G06F 8/20; G06F 8/75
See application file for complete search history.

(56) References Cited

U.S. PATENT DOCUMENTS

| | | | |
|---|---|---|---|
| 10,430,250 B2 | 10/2019 | Ishikawa et al. | |
| 11,025,704 B2 | 6/2021 | Zhu et al. | |
| 11,212,107 B2 | 12/2021 | Beecham et al. | |

(Continued)

OTHER PUBLICATIONS

Wei et al, "A Feature Table approach to decomposing monolithic applications into microservices", 12th Asia-Pacific Symposium on InternetWare, Singapore, Nov. 2020, 20 pgs <Wei_FeatureTable.pdf>.*

(Continued)

*Primary Examiner* — Tuan A Vu
(74) *Attorney, Agent, or Firm* — Kendal M. Sheets

(57) ABSTRACT

The disclosure relates to method and system for identifying microservices in a monolith application. In an embodiment, the method may include classifying a Table of a plurality of Tables associated with a database of the monolith application as an aggregate root Table, and identifying one or more dependent-Tables associated with the aggregate root Table. The method may further include identifying one or more Functions associated with the aggregate root Table and each of the one or more dependent-Tables associated with the aggregate root Table, and generating a microservice by collating the aggregate root Table, the one or more dependent-Tables associated with the aggregate root Table, and the one or more Functions associated with the aggregate root Table and each of the one or more dependent-Tables associated with the aggregate root Table.

20 Claims, 11 Drawing Sheets

| Aggregate Root | Dependent Tables | Associated Methods |
|---|---|---|
| T1 | T2, T3, T7, T8 | M1, M2, M4, M3, M8, M10 |
| T4 | T5, T6, T12 | M5, M6, M7, M9 |
| T10 | T4, T11, T15, T16 | M1, M4, M11 |
| T13 | T8, T9, T14 | M1, M4, M5, M11, M3, M8, M10 |
| T17 | | M5, M7, M6, M9 |

(51) Int. Cl.
    *G06F 16/28*     (2019.01)
    *G06F 16/23*     (2019.01)

(56) References Cited

U.S. PATENT DOCUMENTS

| | | |
|---|---|---|
| 11,321,217 B1 | 5/2022 | Agarwal et al. |
| 2023/0018975 A1* | 1/2023 | Sreenivasan ........ G06F 16/2379 |
| 2023/0094887 A1* | 3/2023 | Sridhara ................... G06F 8/75 |
| | | 717/110 |
| 2023/0168887 A1* | 6/2023 | Tamilselvam ............ G06F 8/75 |
| | | 717/120 |

OTHER PUBLICATIONS

Araf Karsh Hamid; Domain Driven Design; Slide share; Aug. 27, 2020; NJ, USA.

BC. Jiri Siroky; From Monolith to Microservices: Refactoring Patterns; Masaryk University Faculty of Informatics; Brno, Fall 2021; pp. 1-117.

* cited by examiner

METHOD AND SYSTEM FOR IDENTIFYING MICROSERVICES IN A MONOLITH APPLICATION

TECHNICAL FIELD

This disclosure relates generally to creating microservices, and more particularly to method and system for identifying microservices from a monolith application and decomposing the monolith application to create multiple Microservices.

BACKGROUND

The microservice architecture helps in splitting a large codebase into small manageable applications. The microservice architecture provides various advantages including helping in scaling development and reducing Time to Market (TTM). Due to these advantages, many businesses want to migrate from monolith to microservice architecture.

A critical part of a microservice development is the identification of microservices. Microservices should be based on the business capabilities rather than the technical capabilities. Although, various techniques may be used for the microservice identification. However, incorrect identification of the microservices might make the monolith application a distributed monolith which may lose even its existing utility.

Therefore, there is a need for solutions for analyzing an existing monolith application to accurately perform decomposition of the monolith application into various microservices.

SUMMARY

In an embodiment, a method of identifying microservices in a monolith application is disclosed. The method may include classifying a Table of a plurality of Tables associated with a database of the monolith application as an aggregate root Table, based on an analysis of each of a plurality of parameters associated with each of the plurality of Tables. The method may further include identifying one or more dependent-Tables associated with the aggregate root Table, and identifying one or more Functions associated with the aggregate root Table and each of the one or more dependent-Tables associated with the aggregate root Table. The method may further include generating a microservice by collating the aggregate root Table, the one or more dependent-Tables associated with the aggregate root Table, and the one or more Functions associated with the aggregate root Table and each of the one or more dependent-Tables associated with the aggregate root Table.

In another embodiment, a system for identifying microservices in a monolith application is disclosed. The system includes a processor and a memory. The memory stores a plurality of processor-executable instructions, which upon execution, cause the processor to classify a Table of a plurality of Tables associated with a database of the monolith application as an aggregate root Table, based on an analysis of each of a plurality of parameters associated with each of the plurality of Tables. The plurality of processor-executable instructions, upon execution, further cause the processor to identify one or more dependent-Tables associated with the aggregate root Table, and identify one or more Functions associated with the aggregate root Table and each of the one or more dependent-Tables associated with the aggregate root Table. The plurality of processor-executable instructions, upon execution, further cause the processor to generate a microservice by collating the aggregate root Table, the one or more dependent-Tables associated with the aggregate root Table, and the one or more Functions associated with the aggregate root Table and each of the one or more dependent-Tables associated with the aggregate root Table.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The present disclosure provides for methods and systems for identifying multiple microservices in an existing monolith application. The present disclosure provides for identifying microservices, for example, based on Domain Driven Design (DDD) which helps in the microservice identification by splitting the entire monolith application in some bounded context. Each bounded context can be a prospective microservice. Each bounded context can have one or more aggregate roots. Aggregate is a pattern in DDD which is a set of domain objects, which can be treated as a single unit. An aggregate can have one aggregate root. All communication must be handled through the aggregate root only. These aggregates and entities leave some footprint on the application design and behavior. By analyzing the monolith application, the business logic and the associated entities can be identified which can be helpful in creating microservices from the existing monolith application.

A typical monolith web application includes a codebase and a database. In order to identify the microservices, analysis is required for both the codebase as well as the database. Both these analyses can be done in parallel. The present disclosure is based on identifying aggregate roots in the monolith application, for creating the microservices.

Figure 1:
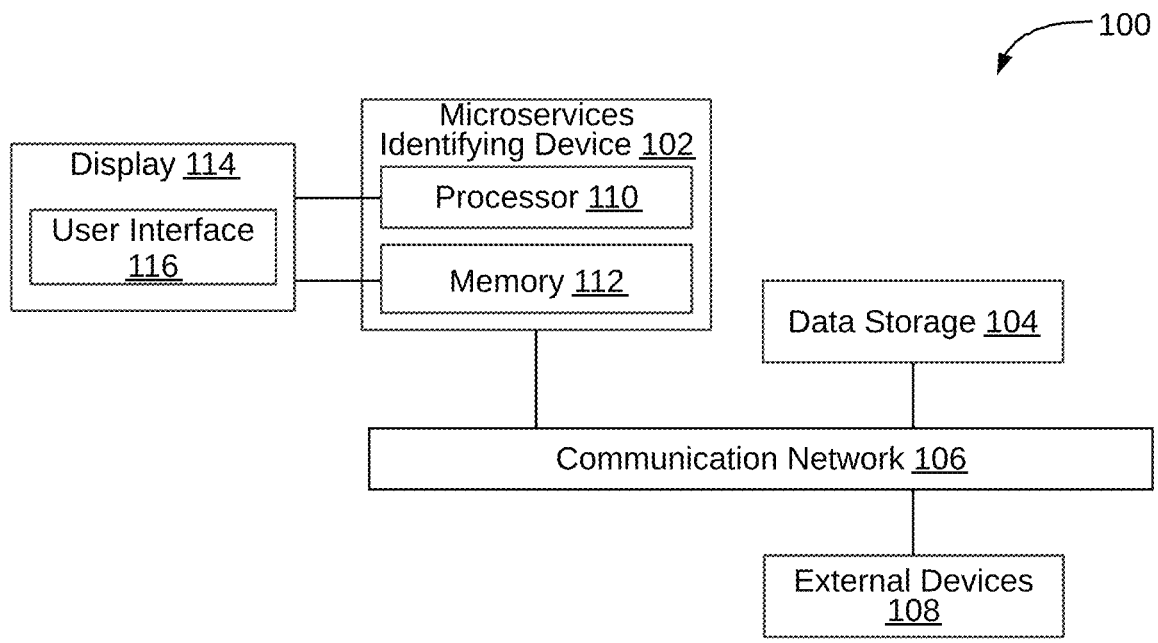
FIG. 1 is a block diagram of an exemplary system for identifying microservices in a monolith application, in accordance with some embodiments of the present disclosure.

Referring now to FIG. 1, a block diagram of an exemplary system 100 for identifying microservices in a monolith application is illustrated, in accordance with some embodiments of the present disclosure. The system 100 may implement a microservices identifying device 102. Further, the system 100 may include a data storage 104. In some embodiments, the data storage 104 may store the monolith application i.e. the data including the source code associated with the monolith application. The microservices identifying device 102 may be a computing device having data processing capability. In particular, the microservices identifying device 102 may have the capability for identifying a microservices from the existing monolith application. Examples of the microservices identifying device 102 may include, but are not limited to a desktop, a laptop, a notebook, a netbook, a tablet, a smartphone, a mobile phone, an application server, a web server, or the like.

The system 100 may further include an input/output (I/O) device which may further implement a display 114 and a user interface 116. Examples may include, but are not limited to a display, keypad, microphone, audio speakers, vibrating motor, LED lights, etc. The I/O device may receive input from a user and also display an output of the computation performed by the microservices identifying device 102.

Additionally, the microservices identifying device 102 may be communicatively coupled to an external device 108 for sending and receiving various data. Examples of the external device 108 may include, but are not limited to, a remote server, digital devices, and a computer system. The microservices identifying device 102 may connect to the external device 108 over a communication network 106. The microservices identifying device 102 may connect to external device 108 via a wired connection, for example via Universal Serial Bus (USB). A computing device, a smartphone, a mobile device, a laptop, a smartwatch, a personal digital assistant (PDA), an e-reader, and a tablet are all examples of external devices 108.

The microservices identifying device 102 may be configured to perform one or more functionalities that may include classifying a Table of a plurality of Tables associated with a database of the monolith application as an aggregate root Table, based on an analysis of each of a plurality of parameters associated with each of the plurality of Tables, and identifying, by the microservices identifying device, one or more dependent-Tables associated with the aggregate root Table. The one or more functionalities may further include identifying one or more Functions associated with the aggregate root Table and each of the one or more dependent-Tables associated with the aggregate root Table, and generating a microservice by collating the aggregate root Table, the one or more dependent-Tables associated with the aggregate root Table, and the one or more Functions associated with the aggregate root Table and each of the one or more dependent-Tables associated with the aggregate root Table. In order to perform the above one or more functionalities, the microservices identifying device 102 may include a processor 110 and a memory 112.

Figure 2:
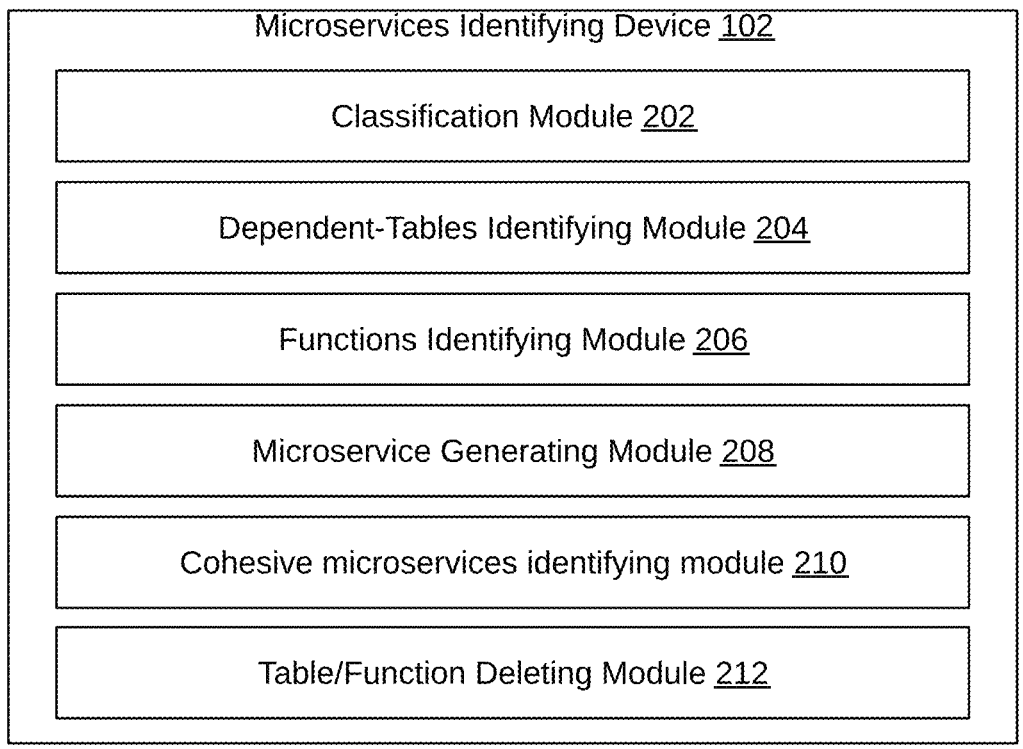
FIG. 2 illustrates a block diagram of the microservices identifying device showing one or more modules, in accordance with some embodiments.

Referring now to FIG. 2, a block diagram of the microservices identifying device 102 showing one or more modules is illustrated, in accordance with some embodiments. In some embodiments, the microservices identifying device 102 may include a classification module 202, a dependent-Tables identifying module 204, a Functions identifying module 206, a microservice generating module 208, a cohesive microservices identifying module 210, and a Table/Function deleting module 212.

The classification module 202 may be configured to classify a Table of a plurality of Tables associated with a database of the monolith application as an aggregate root Table. The classification may be performed based on an analysis of each of a plurality of parameters associated with each of the plurality of Tables. By way of an example, the plurality of parameters associated with each of the plurality of Tables may include an entity relationship parameter, a foreign key references parameter, an entity size parameter, a datatypes parameter, a secondary indexes parameter, and an Atomicity, Consistency, Isolation, and Durability (ACID) transactions parameter.

The dependent-Tables identifying module 204 may be configured to identify one or more dependent-Tables associated with the aggregate root Table. In some embodiments, the one or more dependent-Tables associated with the aggregate root Table may be identified based on the entity relationship parameter and the ACID transaction parameter associated with the plurality of Tables.

The Functions identifying module 206 may be configured to identify one or more Functions associated with the aggregate root Table and each of the one or more dependent-Tables associated with the aggregate root Table. In some embodiments, the one or more Functions associated with the aggregate root Table and each of the one or more dependent-Tables associated with the aggregate root Table are identified by relating the aggregate root Table and the one or more dependent-Tables with code base and associated call stack of the monolith application.

The microservice generating module 208 may be configured to generate a microservice by collating the aggregate root Table, the one or more dependent-Tables associated with the aggregate root Table, and the one or more Functions associated with the aggregate root Table and each of the one or more dependent-Tables associated with the aggregate root Table.

The cohesive microservices identifying module 210 may be configured to identify cohesive microservices from the plurality of microservices, upon generating a plurality of microservices. In some embodiments, the cohesive microservices identifying module 210 may identify the cohesive microservices by identifying, from the database, relevant read queries having reference for an aggregate root Table; identifying, within the relevant read queries, references for remaining of the plurality of Tables; selecting one or more Tables from the plurality of Tables having corresponding references greater than a predefined threshold number of references; and merging selected one or more Tables with the microservice corresponding to the aggregate root Table. The Table/Function deleting module 212 may be configured to delete one of a Table or a Function, based on redundancy, upon generating of the microservice.

Figure 3:
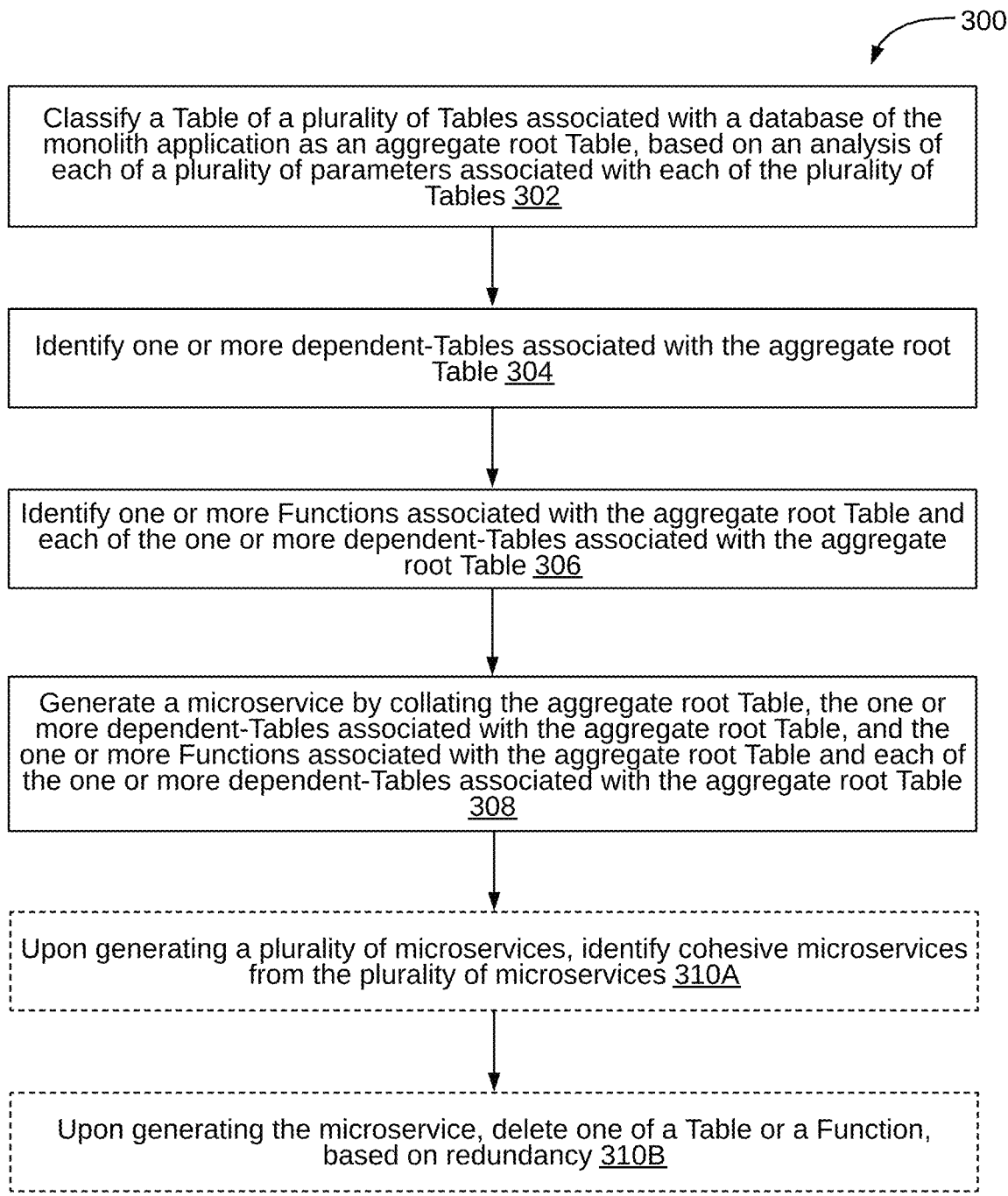
FIG. 3 is a flowchart of a method of identifying microservices in a monolith application, in accordance some an embodiment

Referring now to FIG. 3, a flowchart of a method 300 of identifying microservices in a monolith application is illustrated, in accordance with some embodiments. For example, the method 300 may be performed by the microservices identifying device 102, as discussed above.

At step 302, a Table of a plurality of Tables associated with a database of the monolith application may be classified as an aggregate root Table, based on an analysis of each of a plurality of parameters associated with each of the plurality of Tables.

As will be appreciated by those skilled in the art, a monolith application may include a codebase and a database. As such, analysis is required for both the codebase and the database, to identify the microservices within the monolith application. Analysis of both can be done in parallel. As will be understood, any codebase and database may include data Tables, Functions, and Methods. The analysis to identify the microservices within the monolith application may include (i) identifying inter-relationship between Functions and Methods, (ii) identifying inter-relationship between Tables, and (iii) identifying certain Tables as aggregate roots.

(i) Identifying Inter-Relationship Between Functions and Methods

In order to identify inter-relationship between Functions and Methods, a multi-dimensional analysis may be needed for the existing codebase. In this analysis, each entry point or the endpoint may be analyzed. The analysis can be achieved by static analysis of the codebase, wherein different matrices and the call stack for each endpoint are captured. For example, this analysis may include capturing call stack starting from each endpoint, analyzing the usage pattern for each Function in the codebase, and identifying which Function consumes which database scripts to find a relation with the database entities. As will be appreciated, each Function may have one or more related Methods within the codebase and data base.

(ii) Identifying Inter-Relationship Between Tables

Once the call stack in the codebase and the relation of Function with the database entities are identified, next the database may be analyzed. This analysis may include all the database scripts like Store Procedures, Functions, Triggers, Indexes, Tables, and Keys. In this step, it is identified how each Table in the database is related to the Scripts in the database. This helps in the decomposition as the linkage between database script and codebase has already been established, as described above. Read and write queries are identified separately which further helps in decomposition.

(iii) Identifying Certain Tables as Aggregate Roots.

The database of the monolithic application may be analyzed from various dimensions to calculate all the required information as explained in the following steps. As mentioned above, the monolith application may include a plurality of Tables and a Table of the plurality of Tables associated with the database of the monolith application may be classified as an aggregate root Table, based on an analysis of each of a plurality of parameters associated with each of the plurality of Tables. Classifying a Table of the plurality of Tables as the aggregate root Table is further explained in detail in conjunction with FIG. 4.

Figure 4:
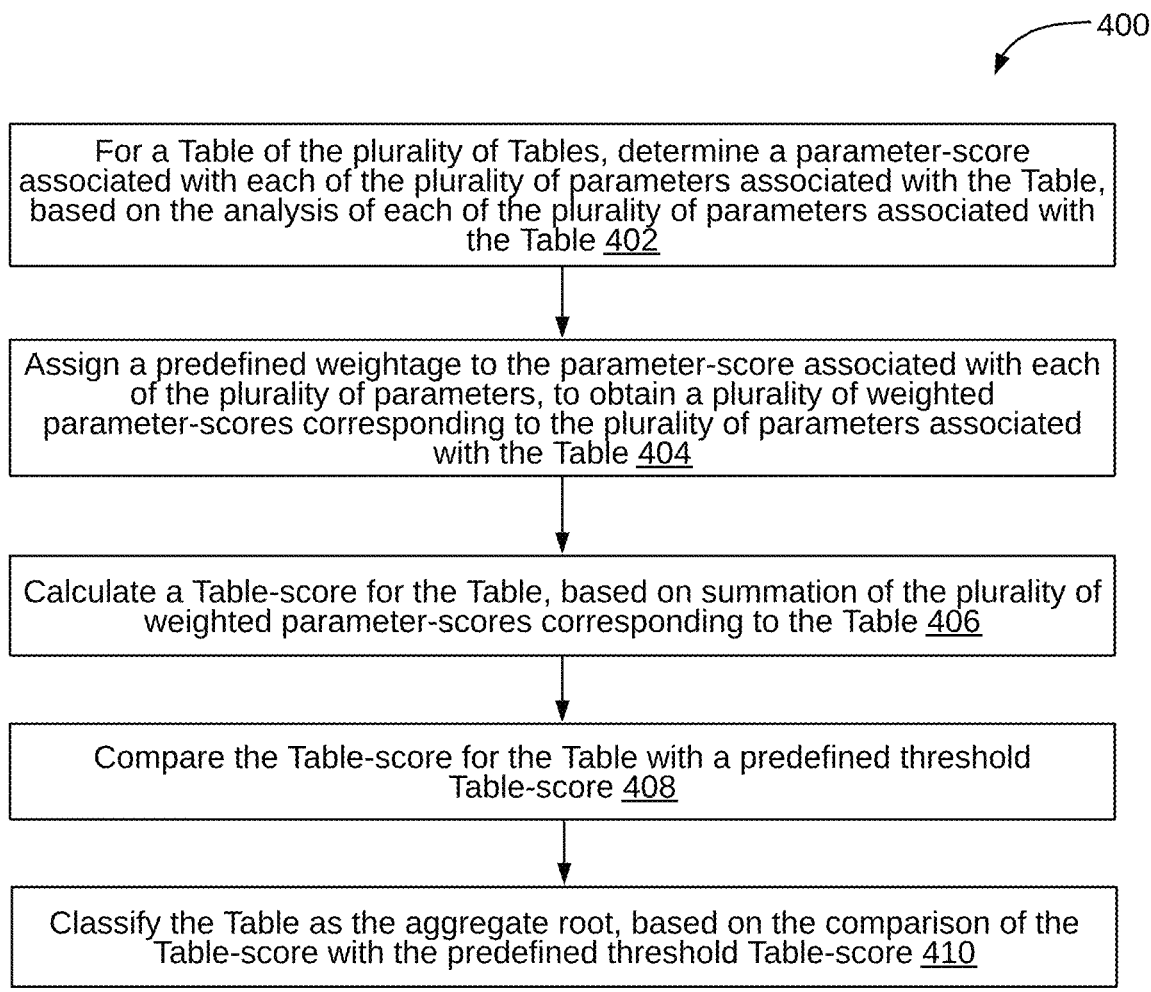
FIG. 4 is a flowchart of a method of classifying a Table of the plurality of Tables as the aggregate root Table, in accordance with some embodiments.

Referring now to FIG. 4, a flowchart of a method 400 of classifying a Table of the plurality of Tables as the aggregate root Table is illustrated, in accordance with some embodiments. At step 402, for a Table of the plurality of Tables, a parameter-score associated with each of the plurality of parameters associated with the Table may be determined. The parameter-score associated with each of the plurality of parameters associated with the Table may be determined based on the analysis of each of the plurality of parameters associated with the Table. For example, the plurality of parameters associated with each of the plurality of Tables may include (i) entity relationship, (ii) foreign key references, (iii) entity size, (iv) datatypes, (v) secondary indexes, and (vi) Atomicity, Consistency, Isolation, and Durability (ACID) transactions. Each of the plurality of parameters associated with each of the plurality of Tables may be analyzed, as described in conjunction with FIGS. 5-13.

(i) Analyzing Entity Relationship Parameter

Figures 5, 6:
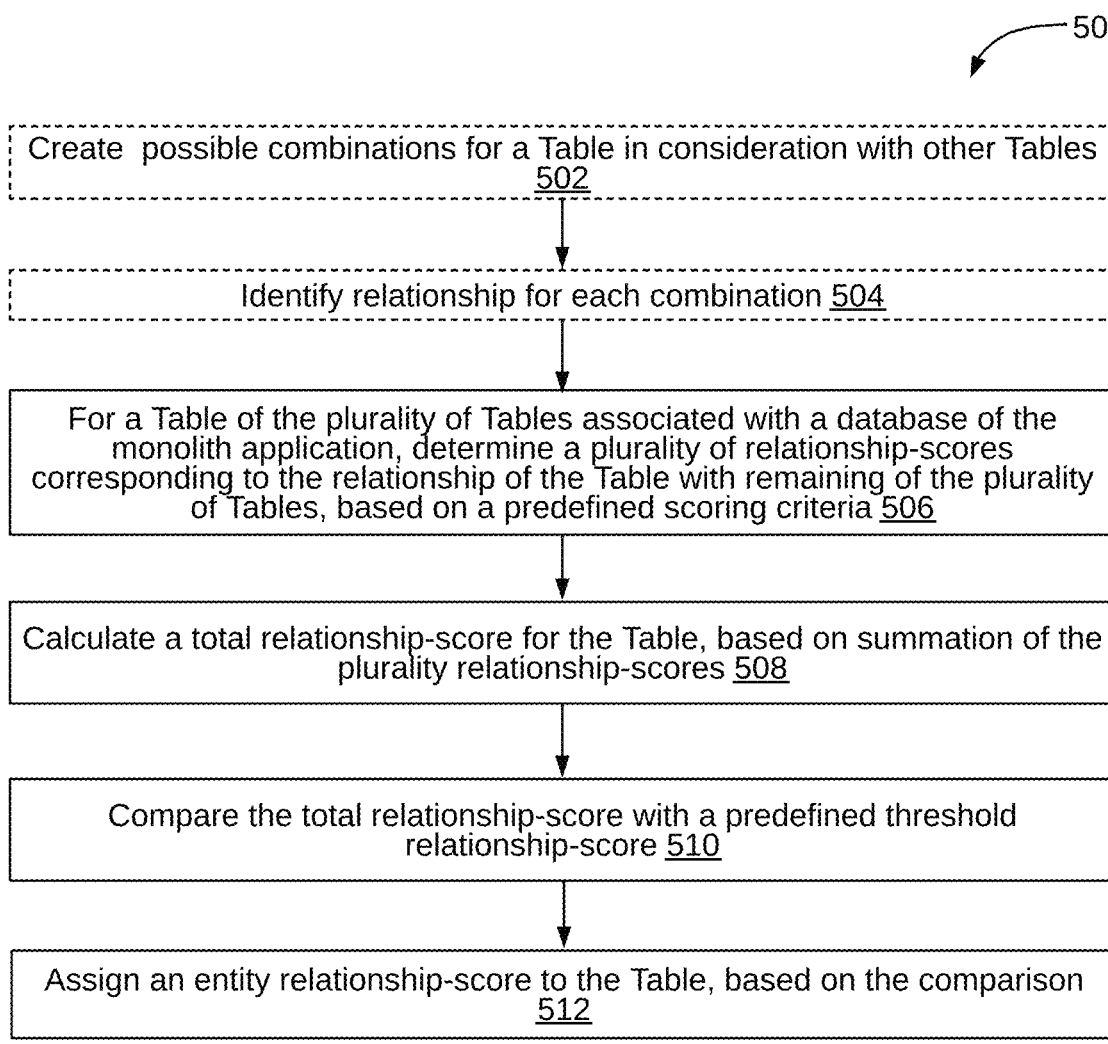
FIG. 5 is a flowchart of a method of analyzing entity relationship, in accordance with some embodiments.
FIG. 6 illustrates a scoring chart showing predefined scoring criteria for analyzing the entity relationship, in accordance with some embodiments.

Referring now to FIG. 5, a flowchart of a method 500 of analyzing the entity relationship is illustrated, in accordance with some embodiments. It should be noted that in an aggregate dependent entity holds reference for the root entity, as therefore, they can be queried and linked together. In the analysis of the entity relationship parameter, all the entities and their relationship in a database are analyzed, to determine an entity relationship-score for the Table. A score for each Table in the database is determined separately.

At step 502, all possible combinations for the Table in consideration with other Tables are created. If the number of Tables in the database is "n", then number of possible combinations are "n−1". At step 504, relationship for each combination may be identified. At step 506, for a Table of the plurality of Tables associated with the database of the monolith application, a plurality of relationship-scores corresponding to the relationship of the Table with remaining of the plurality of Tables may be determined, based on a predefined scoring criteria. In other words, a score may be assigned to each combination, based on the predefined scoring criteria. The predefined scoring criteria is depicted via a scoring chart 600, as illustrated in FIG. 6.

As shown in the scoring chart 600, for a relation (R1) "One to One", a predefined score 1 may be assigned to the Table; for a relation (R2) "One to many", a predefined score 2 may be assigned to the Table; for a relation (R3) "Many to One", a predefined score 0 may be assigned to the Table; for a relation (R4) "Many to Many", a predefined score 0 may be assigned to the Table; and for a relation (R5) "None", a predefined score 0 may be assigned to the Table.

Referring back to FIG. 5, at step 508, a total relationship-score for the Table may be calculated, based on summation of the plurality of relationship-scores. There may be some linkages with entity relationship and aggregate roots and dependents. For example, a Table having relation "Many to One" may have less chances of being a root. Based on these patterns, the total relationship-score may be calculated.

At step 510, the total relationship-score (t) may be compared with a predefined threshold relationship-score. For example, the predefined threshold relationship-score may be the number of combinations of the Table with other Tables (i.e. n−1). At step 512, an entity relationship-score may be assigned to the Table, based on the comparison. For example, if the total relationship-score (t) is greater than the number of combinations (n-1), i.e. t>=n-1, then the final relationship score assigned may be 1 otherwise 0.

(ii) Analyzing Foreign Key References Parameter

Figure 7:
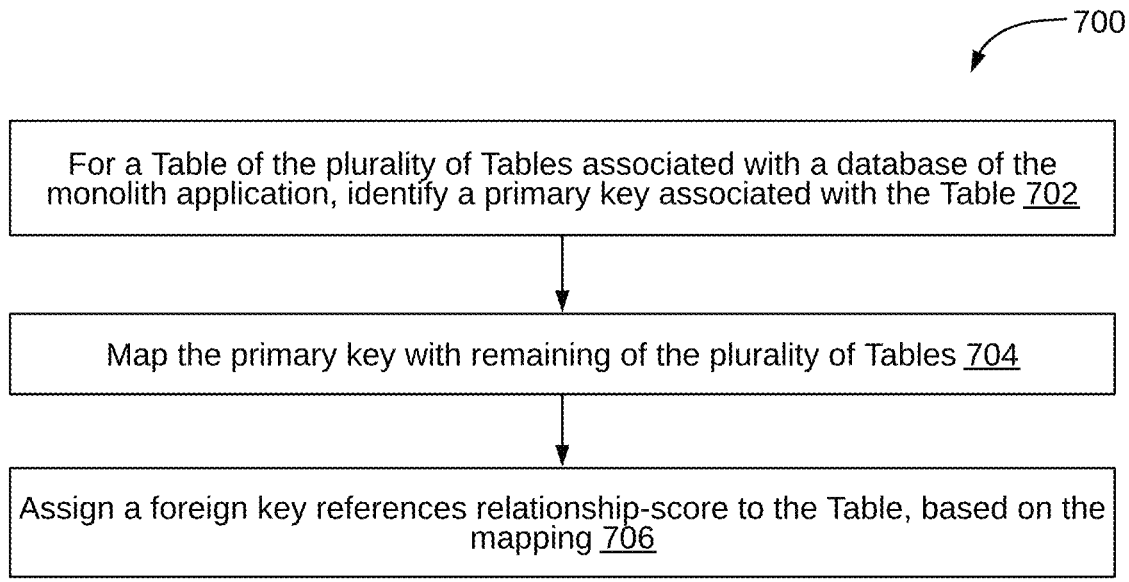
FIG. 7 is a flowchart of a method of analyzing foreign key references, in accordance with some embodiments.

Referring now to FIG. 7, a flowchart of a method 700 of analyzing the foreign key references is illustrated, in accordance with some embodiments. If the primary identity of a Table is not referenced at all in other Tables, then as per the analysis it has been identified that there is a less chance of being aggregate root. The method 700 may involve all the Tables, associated primary keys, and foreign key references in the database.

At step 702, for a Table of the plurality of Tables associated with a database of the monolith application, a primary key associated with the Table may be identified. At step 704, the primary key may be mapped with remaining of the plurality of Tables. To this end, every Table may be scanned to find if there is any Table which may be referencing the primary key of the Table in consideration At step 706, a foreign key references relationship-score may be assigned to the Table, based on the mapping. If there is at least one reference, then a foreign key references relationship-score of 1 is assigned to the Table, otherwise a foreign key references relationship-score of 0 may be assigned to that said Table.

(iii) Analyzing Entity Size Parameter

Figure 8:
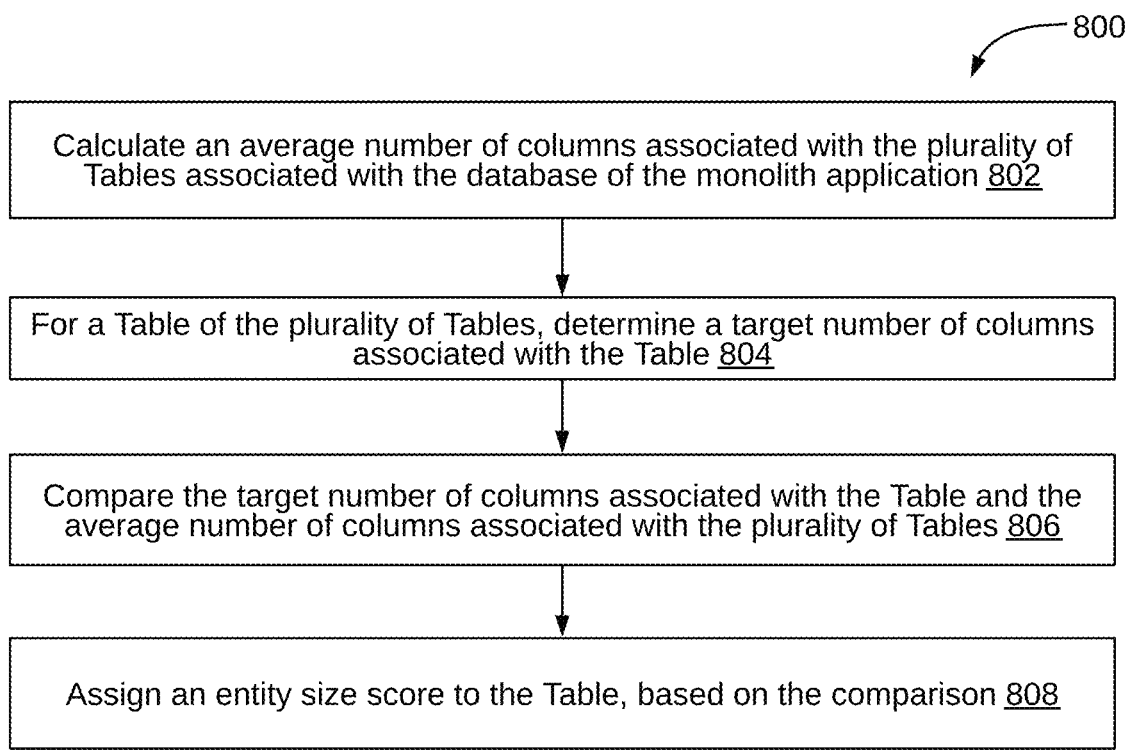
FIG. 8 is a flowchart of a method of analyzing entity size, in accordance with some embodiments.

Referring now to FIG. 8, a flowchart of a method 800 of analyzing the entity size is illustrated, in accordance with some embodiments. The size of the Table is analyzed via the method 800.

At step 802, an average number of columns associated with the plurality of Tables associated with the database of the monolith application may be calculated. At step 804, for a Table of the plurality of Tables, a target number of columns associated with the Table may be determined.

At step 806, the target number of columns associated with the Table may be compared with the average number of columns associated with the plurality of Tables. At step 808, an entity size score may be assigned to the Table, based on the comparison. If number of columns in the Table is greater than or equal to the average number of columns in the database, then an entity size score of 1 is assigned to the Table, otherwise an entity size score of 0 is assigned to the Table.

(iv) Analyzing Datatypes Parameter

Figure 9:
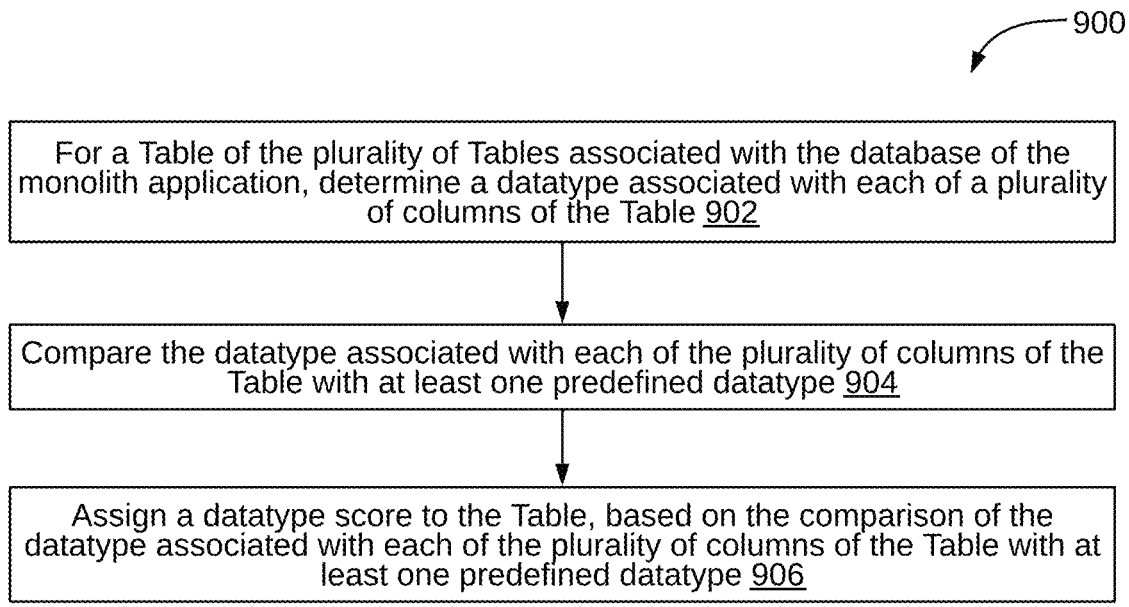
FIG. 9 is a flowchart of a method of analyzing datatypes, in accordance with some embodiments.

Referring now to FIG. 9, a flowchart of a method 900 of analyzing the datatypes is illustrated, in accordance with some embodiments. The method 900 may involve all the Tables, associated columns, and their datatypes in the database.

At step 902, for a Table of the plurality of Tables associated with the database of the monolith application, a datatype associated with each of a plurality of columns of the Table may be determined. At step 904, the datatype associated with each of the plurality of columns of the Table may be compared with at least one predefined datatype.

At step 906, a datatype score may be assigned to the Table, based on the comparison of the datatype associated with each of the plurality of columns of the Table with at least one predefined datatype. For example, (a) if datatypes of all the columns are same, or (b) if none of the datatype is of datatype "Date" or "Date Time", then a datatype score of 1 may be assigned to the Table, otherwise, a datatype score of 0 may be assigned to the Table.

(v) Analyzing Secondary Indexes Parameter

Figure 10:
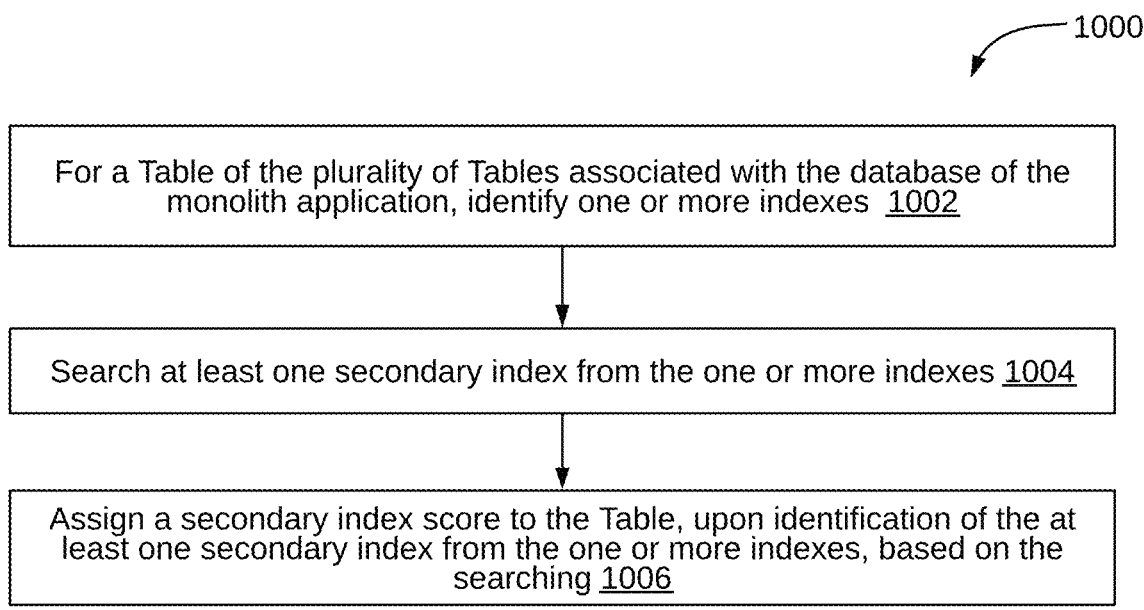
FIG. 10 is a flowchart of a method of analyzing secondary indexes parameter, in accordance with some embodiments.

Referring now to FIG. 10, a flowchart of a method 1000 of analyzing the secondary indexes parameter is illustrated, in accordance with some embodiments. The method 1000 involves all indexes associated with the Tables.

At step 1002, for a Table of the plurality of Tables associated with the database of the monolith application, one or more indexes may be identified. At step 1004, at least one secondary index may be searched from the one or more indexes. In other words, primary indexes and secondary indexes may be identified.

At step 1006, a secondary index score may be assigned to the Table, upon identification of the at least one secondary index from the one or more indexes, based on the searching. If there is at least one secondary index in the Table, then a secondary index score of 1 may be assigned to the Table, otherwise, a secondary index score of 0 may be assigned to the Table.

(vi) Analyzing ACID Transactions Parameter

Figure 11:
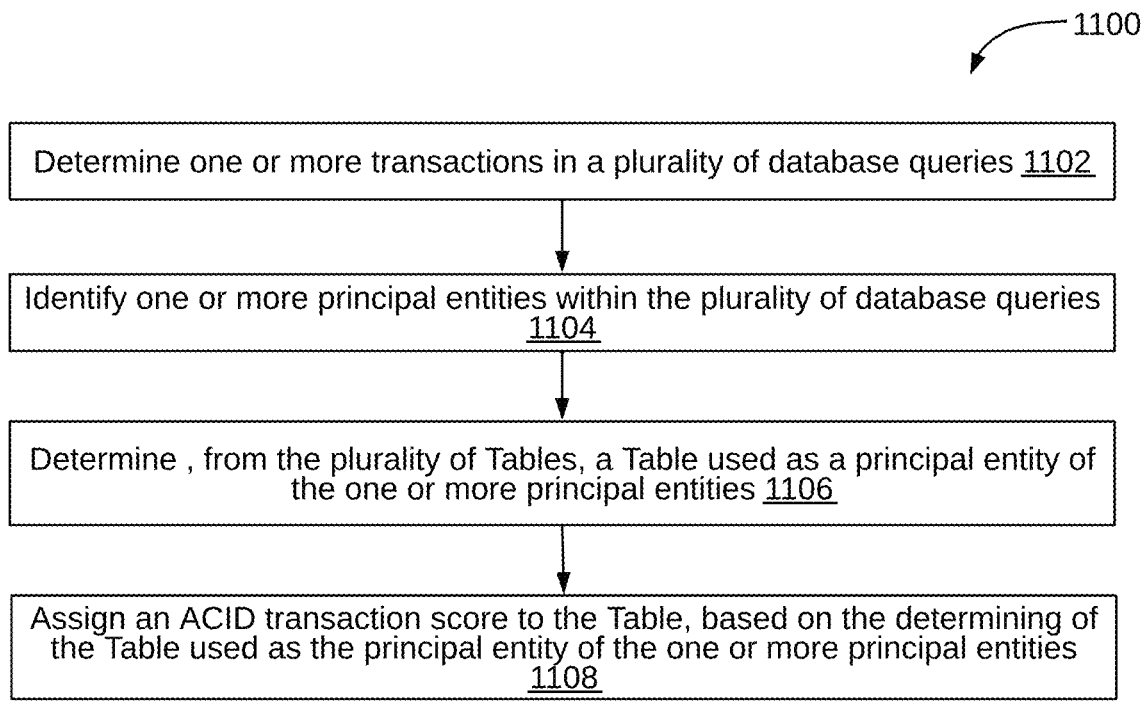
FIG. 11 is a flowchart of a method of analyzing ACID transactions parameter, in accordance with some embodiments.

Referring now to FIG. 11, a flowchart of a method 1100 of analyzing the ACID transactions parameter is illustrated, in accordance with some embodiments. The method 1100 involves all the ACID transactions in the database.

At step 1102, one or more transactions may be determined in a plurality of database queries. In other words, all the transactions in the database queries may be identified. At step 1104, one or more principal entities may be identified within the plurality of database queries. All the queries may be scanned to identify principal entity in the query. Principal entity is the Table where insertion is done first in the sequence and in which identity is used in other dependent-Tables.

At step 1106, a Table used as a principal entity of the one or more principal entities may be determined, from the plurality of Table. At step 1108, an ACID transaction score may be assigned to the Table, based on the determining of the Table used as the principal entity of the one or more principal entities. If there is at least one transaction where the Table is used as a principal entity, then an ACID transaction score of 1 may be assigned to the Table, otherwise, an ACID transaction parameter score of 0 may be assigned to the Table.

Therefore, the plurality of parameters (i.e. the entity relationship parameter, the foreign key references parameter, the entity size parameter, the datatypes parameter, the secondary indexes parameter, and the ACID transactions parameter) associated with each of the plurality of Tables are analyzed to determine parameter-scores (i.e. the entity relationship score, the foreign key references score, the entity size score, the datatypes score, the secondary indexes score, and the ACID transactions score) associated with the plurality of parameters associated with the Table are determined.

Referring once again to FIG. 4, at step 404, a predefined weightage may be assigned to the parameter-score associated with each of the plurality of parameters, to obtain a plurality of weighted parameter-scores corresponding to the plurality of parameters associated with the Table. As such, a weightage may be assigned to each parameter based on the size of the footprint for the aggregate root. The parameter scores obtained via methods 600-1100 may be examined further to calculate a total weighted score for the Table. At step 406, a Table-score may be calculated for the Table, based on summation of the plurality of weighted parameter-scores corresponding to the Table. By way of an example, the calculation of the Table-score is illustrated via score chart 1200 of FIG. 12.

Figure 12:
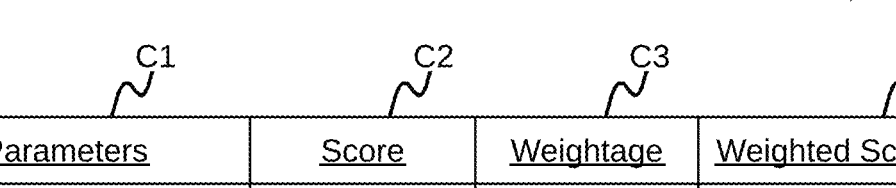
FIG. 12 illustrates a score chart for calculation of Table-score, in accordance with some embodiments.

As shown in FIG. 12, Column-1 (C1) of the score chart 1200 incudes the plurality of parameters associated with a Table, and Column-2 (C2) of the score chart 1200 incudes the parameters-score associated with each of the plurality of parameters, as calculated via methods 6001-1100. For example, for the Table, the entity relationship score as calculated is 1, the foreign key references score as calculated is 0, the entity size score as calculated is 1, the datatypes score as calculated is 1, the secondary indexes score as calculated is 0, and the ACID transactions score as calculated is 1.

Further, Column-3 (C3) of the score chart 1200 incudes the predefined weightage assigned to each of the above plurality of parameters. For example, predefined weightage assigned to the entity relationship parameter is XL(5), the foreign key references parameter is L(4), the entity size parameter is XS(1), the datatypes parameter is M (3), the secondary indexes parameter is S(2), and the ACID transactions parameter is XL(5). Column-4 (C4) includes the weighted score for each of the plurality of parameters that can be calculated by multiplying each parameter-score with the respective predefined weightage. As such, the weighted score for the entity relationship parameter is 5, the foreign key references parameter is 0, the entity size parameter is 1, the datatypes parameter is 3, the secondary indexes parameter is 3, and the ACID transactions parameter is 5. The Table-score, therefore, may be calculated for the Table by summation of the plurality of weighted parameter-scores (i.e. 5+0+1+3+0+5) as 14.

Referring back to FIG. 4, at step 408, the Table-score for the Table may be compared with a predefined threshold Table-score. At step 410, the Table may be classified as the aggregate root, based on the comparison of the Table-score with the predefined threshold Table-score. For example, if the Table-score is greater than or equal to the predefined threshold Table-score, then the corresponding Table may be classified as the aggregate root Table, as is shown via a chart 1300 illustrated in FIG. 13. The chart 1300 depicts the Table-score for a plurality of Tables—Table 1 to Table 9, in a decreasing order of their Table scores. As shown in the chart 1300, of the threshold Table score is 9, then the Tables having Table score higher than or equal to Table score 8, may be classified as aggregate root Tables. As such, Table 3, Table 7, Table 6, and Table 4 having Table scores 20, 20, 14, and 9 may be classified as aggregate root Tables (also, refer FIGS. 15A-15B).

Referring back to FIG. 3, once a Table associated with the database of the monolith application is classified as an aggregate root Table, at step 304, one or more dependent-Tables associated with the aggregate root Table may be identified. In some embodiments, the one or more dependent-Tables associated with the aggregate root Table may be identified based on the entity relationship parameter and the ACID transaction parameter associated with the plurality of Tables. In particular, the entity relationship parameter may help in the identification of all associated Tables. The ACID transaction parameter may help in identifying small grouping of Tables which should be clubbed together.

In some embodiments, one or more clusters of Tables in the database may be created. Each of the one or more clusters of Tables may include the aggregate root Table and all its dependent-Tables. Assuming, Tables T1, T4, T10, T13, and T17 are classified as aggregate root Tables (refer, FIGS. 15A-15B), an example clustering with respect to these aggregate root Tables is presented below.

For aggregate root Table T1, the dependent-Tables may include Tables T2, T3, T7, T8

For aggregate root Table T4, the dependent-Tables may include Tables T5, T6, T12

For aggregate root Table T10, the dependent-Tables may include Tables T4, T11, T15, T16

For aggregate root Table T13, the dependent-Tables may include Tables T8, T9, T14

Further, it may be significant to identify Tables which are common between the clusters. Further, in some embodiments, the Table may be split between the clusters, or alternately, the Table may be duplicated among the clusters in which the Table is common. Once the clusters are identified for the database, the clusters can be related to the codebase and associated call stack. As such, an end-to-end splitting of database and the codebase for each aggregate root may be performed.

Figure 13:
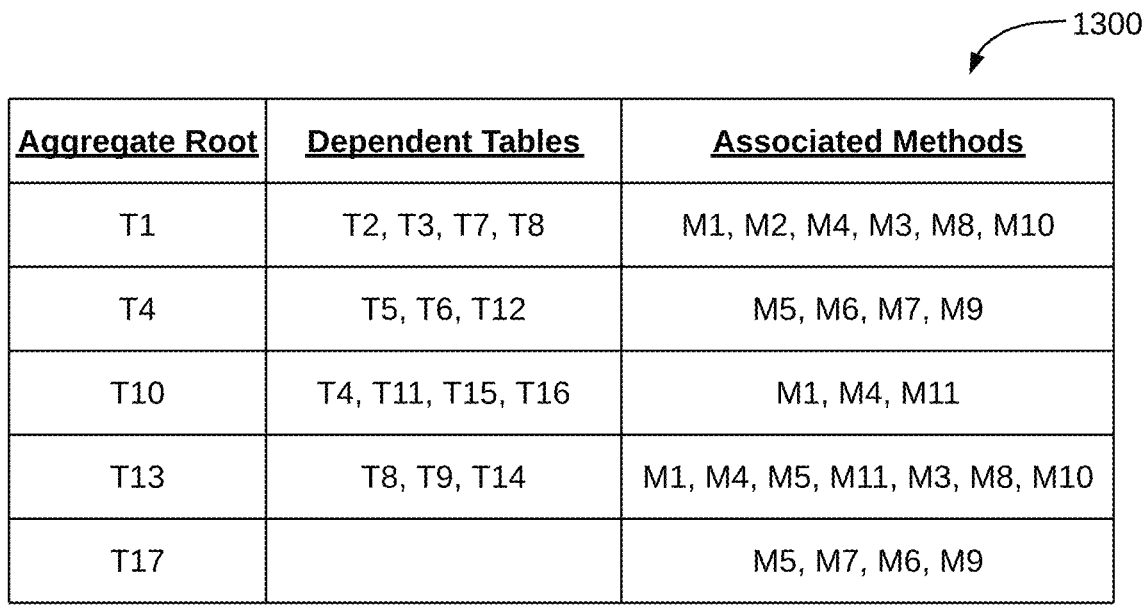
FIG. 13 illustrates a chart for identifying one or more Functions associated with the aggregate root Table and each of the one or more dependent-Tables associated with the aggregate root Table, in accordance with some embodiments.

At step 306, one or more Functions associated with the aggregate root Table and each of the one or more dependent-Tables associated with the aggregate root Table may be identified, as shown via chart 1300 illustrated in FIG. 13. The chart 1300 includes the Tables (T1, T4, T10, T13, T17) classified as aggregate root Table, the one or more dependent-Tables associated with each of the aggregate root Tables, and the Functions associated with each of the aggregate root Table and each of the one or more dependent-Tables associated with the aggregate root Table. As shown in FIG. 13, For aggregate root Table T1, the dependent-Tables may include Tables T2, T3, T7, T8, and the associated Functions include M1, M2, M4, M3, M8, M10

For aggregate root Table T4, the dependent-Tables may include Tables T5, T6, T12, and the associated Functions include M5, M6, M7, M9

For aggregate root Table T10, the dependent-Tables may include Tables T4, T11, T15, T16, and the associated Functions include M1, M4, M11

For aggregate root Table T13, the dependent-Tables may include Tables T8, T9, T14, and the associated Functions include M1, M4, M5, M11, M3, M8, M10

For aggregate root Table T17, the associated Functions include M5, M7, M6, M9

Referring back to FIG. 3, At step 308, a microservice may be generated by collating the aggregate root Table, the one or more dependent-Tables associated with the aggregate root Table, and the one or more Functions associated with the aggregate root Table and each of the one or more dependent-Tables associated with the aggregate root Table. It should be noted that the aggregate root Table, the associated dependent-Tables, and the dependent Methods, as shown above, together may be considered as a potential microservice. As such, for example, based on the aggregate root Table T1, Tables T1, T2, T3, T7, T8 and the Methods M1, M2, M4, M3, M8, M10 together may form a potential microservice.

Additionally, at step 310A, upon generating the plurality of microservices, cohesive microservices may be identified from the plurality of microservices. For example, identifying the cohesive microservices may include identifying, from the database, relevant read queries having reference for an aggregate root Table; identifying, within the relevant read queries, references for remaining of the plurality of Tables; selecting one or more Tables from the plurality of Tables having corresponding references greater than a predefined threshold number of references; and merging selected one or more Tables with the microservice corresponding to the aggregate root Table. Further, at step 310B, upon generating the microservice, one of a Table or a Function may be deleted, based on redundancy. This is further explained in conjunction with FIG. 14.

Optimized Grouping

Once the potential microservices have been identified, then these identified potential microservices may be further analyzed for optimization and for creating a final set of microservices. The analysis may be based on identification of cohesiveness between the identified clusters (i.e. the aggregate root Table, the associated dependent-Tables, and the dependent Methods). If one cluster is dependent on another cluster for most its work, then it is better to put them together as a single microservice to minimize the inter-service communication.

Figure 14:
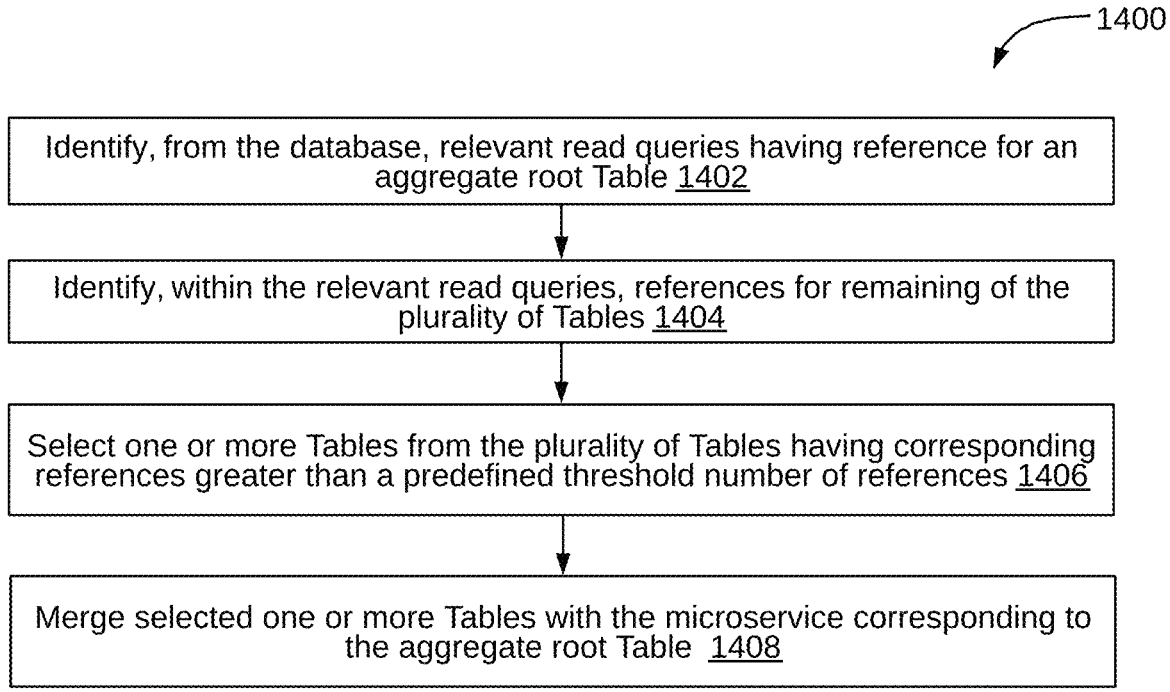
FIG. 14 is a flowchart of a method of identifying cohesive microservices from a plurality of microservices, in accordance with some embodiments.

Referring now to FIG. 14, a flowchart of a method 1400 of identifying cohesive microservices from a plurality of microservices is illustrated, in accordance with some embodiments.

At step 1402, relevant read queries having reference for an aggregate root Table may be identified from the database. For example, the read queries may be identified from the database which are having reference for the aggregate root Table 7. At step 1404, references for remaining of the plurality of Tables may be identified within the relevant read queries. As such, references may be listed for all the aggregate root Tables in those queries with number of occurrences, except for the aggregate root Table 7.

At step 1406, one or more Tables may be selected from the plurality of Tables having corresponding references greater than a predefined threshold number of references. For example, the Tables having number of occurrences more than half of the total number of read queries may be selected. At step 1408, the selected one or more Tables may be merged with the microservice corresponding to the aggregate root Table. As such, the selected one or more Tables may be merged in a single microservice as they are highly cohesive and the size of the merged microservice won't be very large Apart from the above optimization method 1400, some other optimization techniques may be performed as well. For example, these optimization techniques may be based on Method-level analysis or Column-level analysis for granular level affinity identification, as is illustrated in and explained via an exemplary process of FIGS. 15A-15B.

Figure 15A:
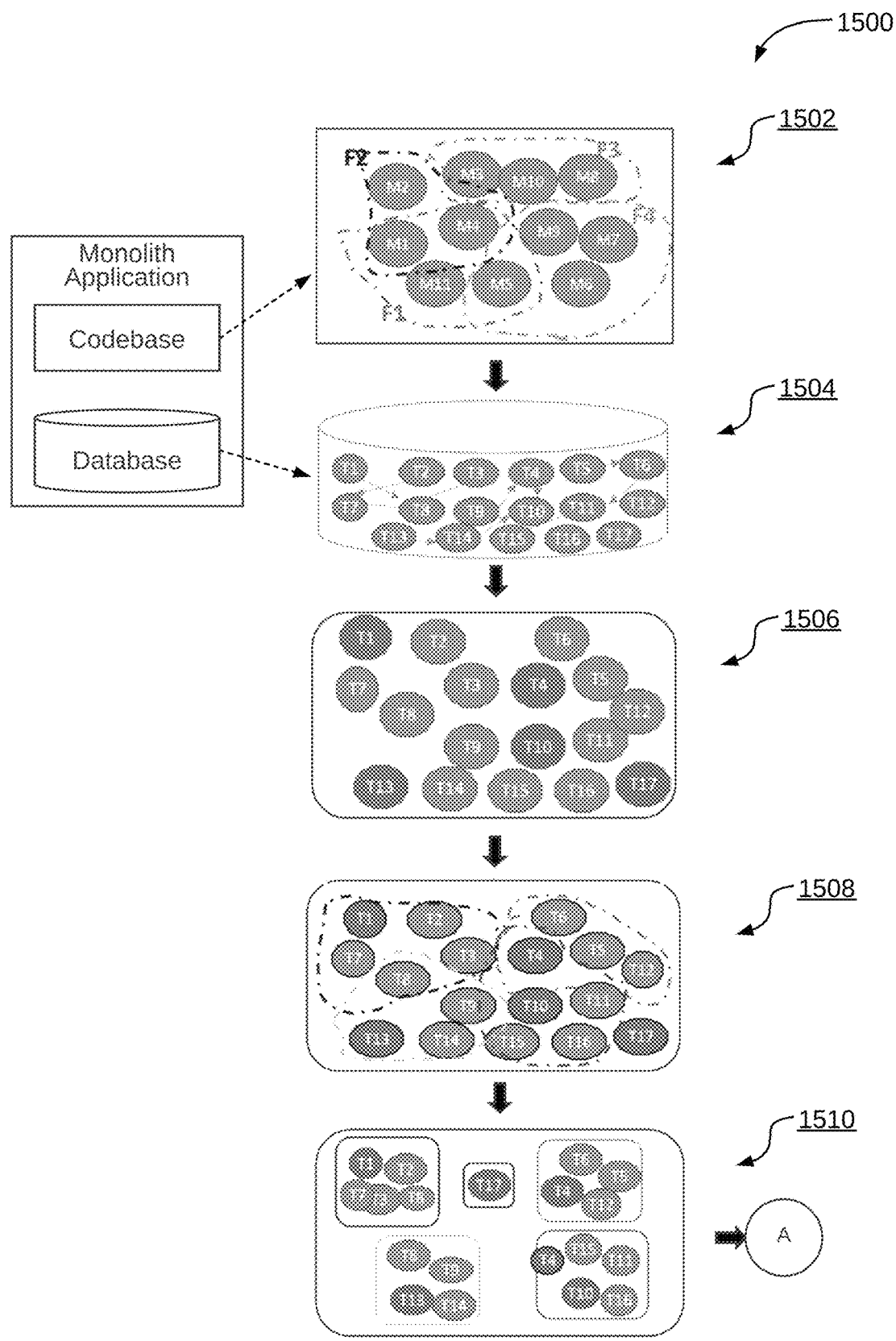
FIGS. 15A-15B is a process diagram of an exemplary process of identifying microservices in a monolith application, in accordance with some embodiments.
Figure 15B:
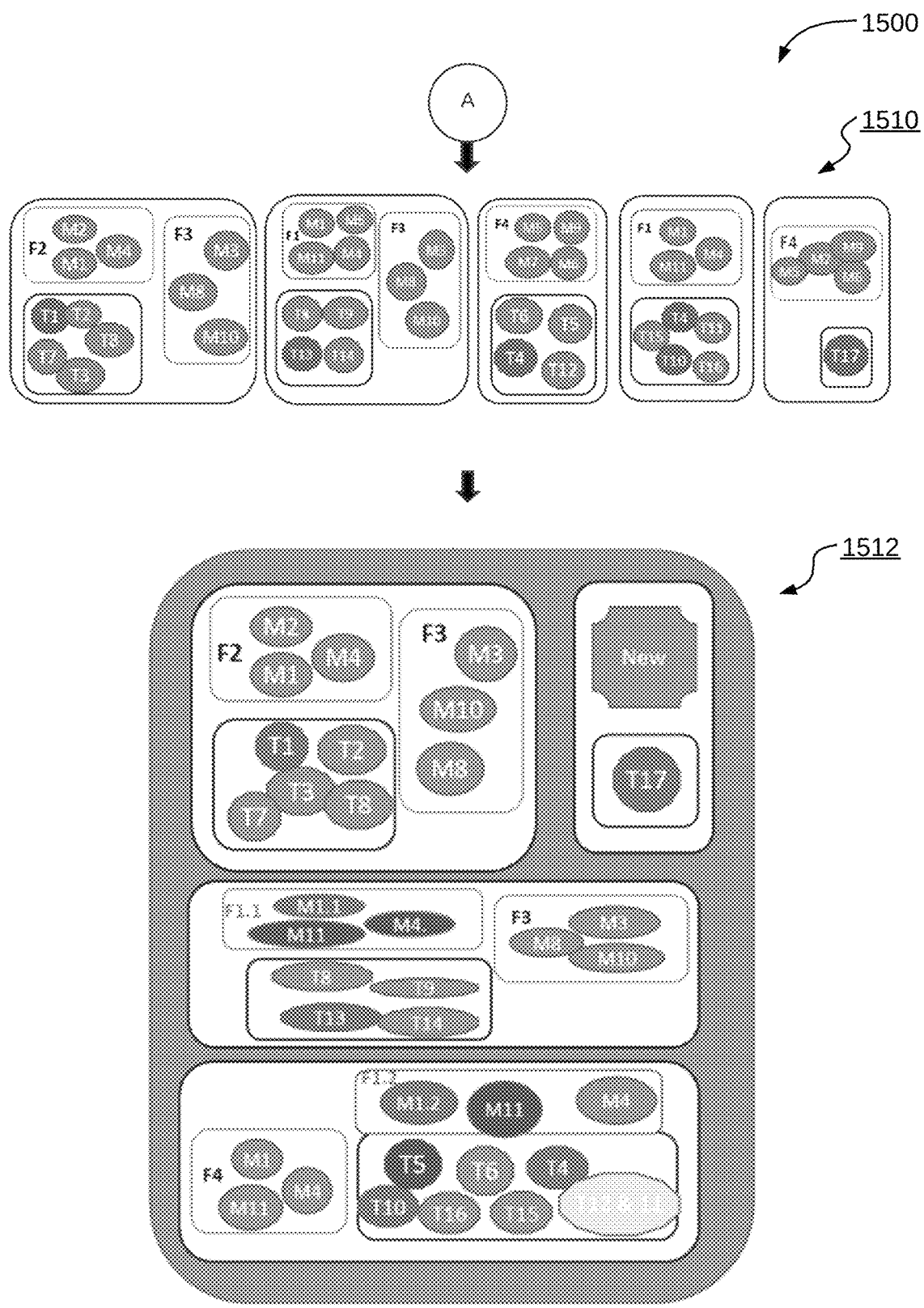

Referring now to FIGS. 15A-15B, a process diagram of an exemplary process 1500 of identifying microservices in a monolith application is illustrated, in accordance with some embodiments. As mentioned above and as shown in FIGS. 15A-15B, a monolith application may include a codebase and a database. In order to identify microservices in the monolith application, both the codebase and the database may be analyzed in parallel. The codebase may be associated with one or more Functions, each one or more Functions including one or more associated Methods. Further, the database may include a plurality of data Tables (or simply called Tables).

At step 1502, interrelationship between Functions and Methods may be identified. To this end, a multi-dimensional analysis may be performed for the existing codebase, to cover each entry point or the endpoint, performing a static analysis of the codebase. Different matrices and the call stack for each endpoint may be captured.

In particular, call stack starting from each endpoint may be captured, and analysis of the usage pattern for each Function in the codebase may be performed. Further, each Function is analyzed to determine which Function consumes which database scripts, so as to find a relation with the database entities. For example, as shown in FIGS. 15A-15B, the Functions and their related Methods may be as follows:

Function F1 has related Methods M1, M4, M5, M11;
Function F2 has related Methods M1, M2, M4;
Function F3 has related Methods M3, M8, M10; and
Function F4 has related Methods M5, M6, M7, M9.

At step 1504, interrelationship between different Tables may be identified. To this end, once the call stack is identified in the codebase and the relation of Functions with the database entities is identified, the database may be analyzed. The analysis may include all the database scripts like store procedures, functions, triggers, indexes, tables, and keys. At step 1504, it is determined how each Table in the database is related to the scripts in the database. Further, read and write queries are identified separately which also helps in decomposition decision.

At step 1506, various parameters associated with the monolith application may be analyzed, to classify Tables as aggregate root Tables. The process of classifying a Table as an aggregate root Table, based on an analysis of each of the plurality of parameters associated with each of the plurality of Tables is already explained via FIGS. 5-13. For example, as shown in FIGS. 15A-15B, the Tables T1, T4, T10, T13, and T17 may be classified as aggregate root Tables, based on the above analysis.

At step 1508, dependency and cohesiveness of the aggregate root Tables with other Tables may be analyzed. At step 1510, the dependent-Tables associated with each of the aggregate root Tables T1, T4, T10, T13, and T17 may be identified, to form a cluster for each of the aggregate root Tables T1, T4, T10, T13, and T17. As shown in FIGS. 15A-15B, the clustering with respect to these aggregate root Tables is presented below.

For aggregate root Table T1, the dependent-Tables include Tables T2, T3, T7, T8

For aggregate root Table T4, the dependent-Tables include Tables T5, T6, T12

For aggregate root Table T10, the dependent-Tables include Tables T4, T11, T15, T16

For aggregate root Table T13, the dependent-Tables include Tables T8, T9, T14

It should be noted that the entity relationship parameter and the ACID transaction parameter may be relied on determine the dependent-Tables. The entity relationship parameter may help in the identification of all associated Tables, and the ACID transaction parameter may help in identifying small grouping of Tables which should be clubbed together.

At step 1512, one or more Functions associated with the aggregate root Table and each of the one or more dependent-Tables associated with the aggregate root Table may be identified. As such, as shown in FIGS. 15A-15B, For aggregate root Table T1, the dependent-Tables include Tables T2, T3, T7, T8, and the associated Functions include M1, M2, M4, M3, M8, M10

For aggregate root Table T4, the dependent-Tables include Tables T5, T6, T12, and the associated Functions include M5, M6, M7, M9

For aggregate root Table T10, the dependent-Tables include Tables T4, T11, T15, T16, and the associated Functions include M1, M4, M11

For aggregate root Table T13, the dependent-Tables include Tables T8, T9, T14, and the associated Functions include M1, M4, M5, M11, M3, M8, M10

For aggregate root Table T17, the associated Functions include M5, M7, M6, M9

A microservice may be generated by collating the aggregate root Table, the one or more dependent-Tables associated with the aggregate root Table, and the one or more Functions associated with the aggregate root Table and each of the one or more dependent-Tables associated with the aggregate root Table. As such, for example, based on the aggregate root Table T1, Tables T1, T2, T3, T7, T8 and the Methods M1, M2, M4, M3, M8, M10 together may form a potential microservice.

At step 1514, the once the potential microservices have been identified, then these identified potential microservices may be further analyzed for optimization and generate a final set of microservices. The analysis may be based on identification of cohesiveness between the identified clusters (i.e. the aggregate root Table, the associated dependent-Tables, and the dependent Methods). If one cluster is dependent on another cluster for most its work, then it is better to put them together as a single microservice to minimize the inter-service communication.

For example, for aggregate root table T17 (a single Table aggregate), a new microservice may be created, for various reason including (a) independent nature of the Table T17, affinity nature of the Table T17 with Function F4, and scalability and other performance requirement for the Function around the Table T17. Further, Tables T10 and T4 can be clubbed in a single microservice for various reasons including cohesiveness of the Tables T10 and T4 and their dependent-Tables, cohesiveness of the Functions associated with the Tables T10 and T4, and affinity of the Tables T10 and T4 with the associated Methods. Furthermore, Table T5 can be deleted based on the nature of the columns of the Tables T5 and its association with the columns of other Tables.

In some embodiments, Method M11 can be deleted from the microservices associated with the Tables T4 and T10. However, the Method M11 can be retained in the microservice associated with the Table T13. Similarly, Method M4 can be deleted from the microservice associated with the Table T13. However, the Table T13 can be retained in the microservices associated with the Tables T4 and T10.

The Tables T11 and T12 can be merged based on the nature of the columns of these Tables.

Another microservice can be created which may include the Table T13 as the aggregate root Table. In this microservice, Method M4 can be deleted and Method M1 can be modified to Method M1.1 based on the affinity of the Method M1 and the Table T13. Similarly, a portion of the Method M1 associated with Tables T4 and T10 can be modified to Method M1.2.

A yet another microservice can be created with T1 as aggregate root Table and dependent-Tables and all associated Methods.

Function F3 can be recommended to be duplicated in both the microservices associated with the Tables T1 and T13 considering the affinity and business requirement.

Figure 16:
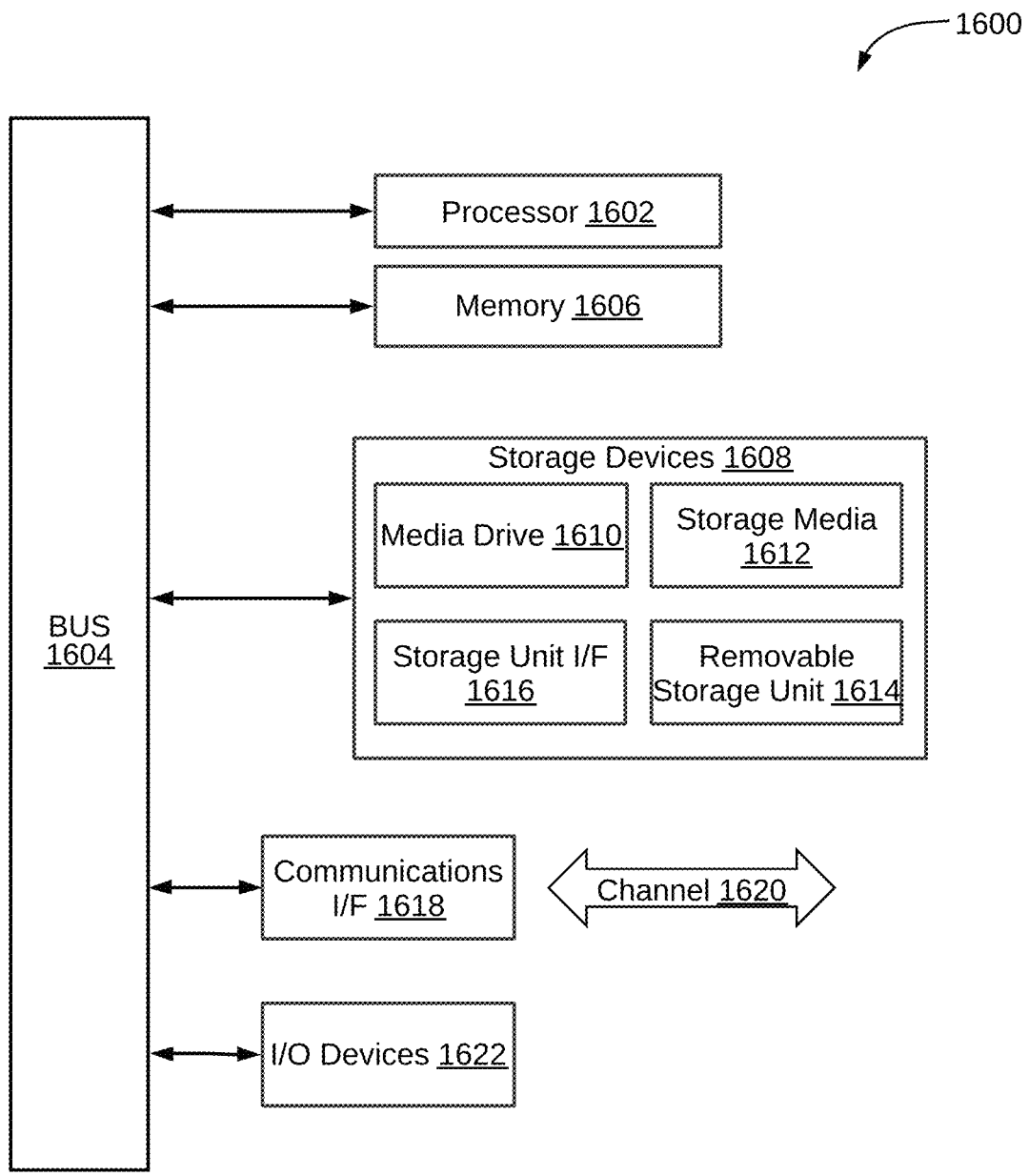
FIG. 16 is an exemplary computing system that may be employed to implement processing functionality for various embodiments.

Referring now to FIG. 16, an exemplary computing system 1600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1600 may represent, for example, a user device such as a desktop, a laptop, a mobile phone, personal entertainment device, DVR, and so on, or any other type of special or general-purpose computing device as may be desirable or appropriate for a given application or environment. The computing system 1600 may include one or more processors, such as a processor 1602 that may be implemented using a general or special purpose processing engine such as, for example, a microprocessor, microcontroller or other control logic. In this example, the processor 1602 is connected to a bus 1604 or other communication media. In some embodiments, the processor 1602 may be an Artificial Intelligence (AI) processor, which may be implemented as a Tensor Processing Unit (TPU), or a graphical processor unit, or a custom programmable solution Field-Programmable Gate Array (FPGA).

The computing system 1600 may also include a memory 1606 (main memory), for example, Random Access Memory (RAM) or other dynamic memory, for storing information and instructions to be executed by the processor 1602. The memory 1606 also may be used for storing temporary variables or other intermediate information during the execution of instructions to be executed by processor 1602. The computing system 1600 may likewise include a read-only memory ("ROM") or other static storage device coupled to bus 1604 for storing static information and instructions for the processor 1602.

The computing system 1600 may also include storage devices 1608, which may include, for example, a media drive 1610 and a removable storage interface. The media drive 1610 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 1612 may include, for example, a hard disk, magnetic tape, flash drive, or other fixed or removable media that is read by and written to by the media drive 1610. As these examples illustrate, the storage media 1612 may include a computer-readable storage medium having stored therein particular computer software or data.

In alternative embodiments, the storage devices 1608 may include other similar instrumentalities for allowing computer programs or other instructions or data to be loaded into the computing system 1600. Such instrumentalities may include, for example, a removable storage unit 1614 and a storage unit interface 1616, such as a program cartridge and cartridge interface, a removable memory (for example, a flash memory or other removable memory module) and memory slot, and other removable storage units and interfaces that allow software and data to be transferred from the removable storage unit 1614 to the computing system 1600.

The computing system 1600 may also include a communications interface 1618. The communications interface 1618 may be used to allow software and data to be transferred between the computing system 1600 and external devices. Examples of the communications interface 1618 may include a network interface (such as an Ethernet or other NIC card), a communications port (such as for example, a USB port, a micro-USB port), Near field Communication (NFC), etc. Software and data transferred via the communications interface 1618 are in the form of signals which may be electronic, electromagnetic, optical, or other signals capable of being received by the communications interface 1618. These signals are provided to the communications interface 1618 via a channel 1620. The channel 1620 may carry signals and may be implemented using a wireless medium, wire or cable, fiber optics, or other communications medium. Some examples of the channel 1620 may include a phone line, a cellular phone link, an RF link, a Bluetooth link, a network interface, a local or wide area network, and other communications channels.

The computing system 1600 may further include Input/Output (I/O) devices 1622. Examples may include, but are not limited to a display, keypad, microphone, audio speakers, vibrating motor, LED lights, etc. The I/O devices 1622 may receive input from a user and also display an output of the computation performed by the processor 1602. In this document, the terms "computer program product" and "computer-readable medium" may be used generally to refer to media such as, for example, the memory 1606, the storage devices 1608, the removable storage unit 1614, or signal(s) on the channel 1620. These and other forms of computer-readable media may be involved in providing one or more sequences of one or more instructions to the processor 1602 for execution. Such instructions, generally referred to as "computer program code" (which may be grouped in the form of computer programs or other groupings), when executed, enable the computing system 1600 to perform features or functions of embodiments of the present invention.

In an embodiment where the elements are implemented using software, the software may be stored in a computer-readable medium and loaded into the computing system 1600 using, for example, the removable storage unit 1614, the media drive 1610 or the communications interface 1618. The control logic (in this example, software instructions or computer program code), when executed by the processor 1602, causes the processor 1602 to perform the functions of the invention as described herein.

One or more techniques for identifying microservices in a monolith application are disclosed. The said identification of the microservices is based on identification of aggregate root Tables, that helps in implementing Domain Driven Design (DDD) in a monolith application between different part of the application. The above one or more techniques help in decomposition of the monolith applications based on both process and data driven approaches. Further, the one or more techniques provides a scientific approach for microservice identification for green field applications.

It is intended that the disclosure and examples be considered as exemplary only, with a true scope and spirit of disclosed embodiments being indicated by the following claims.

What is claimed is:

1. A method of identifying microservices in a monolith application, the method comprising:
    classifying, by a microservices identifying device, a Table of a plurality of Tables associated with a database of the monolith application as an aggregate root Table, based on an analysis of each of a plurality of parameters associated with each of the plurality of Tables;
    identifying, by the microservices identifying device, one or more dependent-Tables associated with the aggregate root Table;
    identifying, by the microservices identifying device, one or more Functions associated with the aggregate root Table and each of the one or more dependent-Tables associated with the aggregate root Table; and
    generating, by the microservices identifying device, a microservice by collating the aggregate root Table, the one or more dependent-Tables associated with the aggregate root Table, and the one or more Functions associated with the aggregate root Table and each of the one or more dependent-Tables associated with the aggregate root Table.

2. The method of claim 1, wherein the one or more Functions associated with the aggregate root Table and each of the one or more dependent-Tables associated with the aggregate root Table are identified by relating the aggregate root Table and the one or more dependent-Tables with code base and associated call stack of the monolith application.

3. The method of claim 1, wherein classifying a Table of the plurality of Tables as the aggregate root Table comprises:
    for a Table of the plurality of Tables, determining a parameter-score associated with each of the plurality of parameters associated with the Table, based on the analysis of each of the plurality of parameters associated with the Table;
    assigning a predefined weightage to the parameter-score associated with each of the plurality of parameters, to obtain a plurality of weighted parameter-scores corresponding to the plurality of parameters associated with the Table;
    calculating a Table-score for the Table, based on summation of the plurality of weighted parameter-scores corresponding to the Table;
    comparing the Table-score for the Table with a predefined threshold Table-score; and
    classifying the Table as the aggregate root Table, based on the comparison of the Table-score with the predefined threshold Table-score.

4. The method of claim 1 further comprising:
    upon generating a plurality of microservices, identifying cohesive microservices from the plurality of microservices, wherein identifying the cohesive microservices comprises:
        identifying, from the database, relevant read queries having reference for an aggregate root Table;
        identifying, within the relevant read queries, references for remaining of the plurality of Tables;
        selecting one or more Tables from the plurality of Tables having corresponding references greater than a predefined threshold number of references; and
        merging selected one or more Tables with the microservice corresponding to the aggregate root Table.

5. The method of claim 1 further comprising at least one of:
    upon generating the microservice, deleting one of a Table or a Function, based on redundancy.

6. The method of claim 1, wherein the plurality of parameters associated with each of the plurality of Tables comprise: an entity relationship parameter, a foreign key references parameter, an entity size parameter, a datatypes parameter, a secondary indexes parameter, and an Atomicity, Consistency, Isolation, and Durability (ACID) transactions parameter.

7. The method of claim 6, wherein analyzing the entity relationship parameter comprises:
    for a Table of the plurality of Tables associated with a database of the monolith application, determining a plurality of relationship-scores corresponding to the relationship of the Table with remaining of the plurality of Tables, based on a predefined scoring criteria;
    calculating a total relationship-score for the Table, based on summation of the plurality of relationship-scores; and
    comparing the total relationship-score with a predefined threshold relationship-score; and
    assigning an entity relationship-score to the Table, based on the comparison.

8. The method of claim 6, wherein analyzing the foreign key references parameter comprises:
    for a Table of the plurality of Tables associated with a database of the monolith application, identifying a primary key associated with the Table;

mapping the primary key with remaining of the plurality of Tables; and assigning an foreign key references relationship-score to the Table, based on the mapping.

9. The method of claim 6, wherein analyzing the entity size parameter comprises:

calculating an average number of columns associated with the plurality of Tables associated with the database of the monolith application;

for a Table of the plurality of Tables, determining a target number of columns associated with the Table;

comparing the target number of columns associated with the Table and the average number of columns associated with the plurality of Tables; and assigning an entity size score to the Table, based on the comparison.

10. The method of claim 6, wherein analyzing the datatypes parameter comprises:

for a Table of the plurality of Tables associated with the database of the monolith application, determining a datatype associated with each of a plurality of columns of the Table;

comparing the datatype associated with each of the plurality of columns of the Table with at least one predefined datatype; and assigning a datatype score to the Table, based on the comparison of the datatype associated with each of the plurality of columns of the Table with at least one predefined datatype.

11. The method of claim 6, wherein analyzing the secondary indexes parameter comprises:

for a Table of the plurality of Tables associated with the database of the monolith application, identifying one or more indexes;

searching at least one secondary index from the one or more indexes; and assigning a secondary index score to the Table, upon identification of the at least one secondary index from the one or more indexes, based on the searching.

12. The method of claim 6, wherein analyzing the ACID transactions parameter comprises:

determining one or more transactions in a plurality of database queries;

identifying one or more principal entities within the plurality of database queries;

determining, from the plurality of Tables, a Table used as a principal entity of the one or more principal entities; and assigning an ACID transaction score to the Table, based on the determining of the Table used as the principal entity of the one or more principal entities.

13. The method of claim 6, wherein the one or more dependent-Tables associated with the aggregate root Table are identified based on the entity relationship parameter and the ACID transaction parameter associated with the plurality of Tables.

14. A system for identifying microservices in a monolith application, the system comprising:

a processor; and a memory communicatively coupled to the processor, wherein the memory stores a plurality of instructions, which upon execution by the processor, cause the processor to:

classify a Table of a plurality of Tables associated with a database of the monolith application as an aggregate root Table, based on an analysis of each of a plurality of parameters associated with each of the plurality of Tables;

identify one or more dependent-Tables associated with the aggregate root Table;

identify one or more Functions associated with the aggregate root Table and each of the one or more dependent-Tables associated with the aggregate root Table; and generate a microservice by collating the aggregate root Table, the one or more dependent-Tables associated with the aggregate root Table, and the one or more Functions associated with the aggregate root Table and each of the one or more dependent-Tables associated with the aggregate root Table.

15. The system of claim 14, wherein the one or more Functions associated with the aggregate root Table and each of the one or more dependent-Tables associated with the aggregate root Table are identified by relating the aggregate root Table and the one or more dependent-Tables with code base and associated call stack of the monolith application.

16. The system of claim 14, wherein classifying a Table of the plurality of Tables as the aggregate root Table comprises:

for a Table of the plurality of Tables, determining a parameter-score associated with each of the plurality of parameters associated with the Table, based on the analysis of each of the plurality of parameters associated with the Table;

assigning a predefined weightage to the parameter-score associated with each of the plurality of parameters, to obtain a plurality of weighted parameter-scores corresponding to the plurality of parameters associated with the Table;

calculating a Table-score for the Table, based on summation of the plurality of weighted parameter-scores corresponding to the Table;

comparing the Table-score for the Table with a predefined threshold Table-score; and classifying the Table as the aggregate root Table, based on the comparison of the Table-score with the predefined threshold Table-score.

17. The system of claim 14, wherein the processor instructions further cause the processor to:

upon generating a plurality of microservices, identify cohesive microservices from the plurality of microservices, wherein identifying the cohesive microservices comprises:

identifying, from the database, relevant read queries having reference for an aggregate root Table;

identifying, within the relevant read queries, references for remaining of the plurality of Tables;

selecting one or more Tables from the plurality of Tables having corresponding references greater than a predefined threshold number of references; and merging selected one or more Tables with the microservice corresponding to the aggregate root Table; and delete one of a Table or a Function, based on redundancy.

18. The system of claim 14, wherein the plurality of parameters associated with each of the plurality of Tables comprise: an entity relationship parameter, a foreign key references parameter, an entity size parameter, a datatypes parameter, a secondary indexes parameter, and an Atomicity, Consistency, Isolation, and Durability (ACID) transactions parameter, and wherein the one or more dependent-Tables associated with the aggregate root Table are identified based on the entity relationship parameter and the ACID transaction parameter associated with each of the plurality of Tables.

19. A non-transitory computer-readable medium storing computer-executable instructions for identifying microservices in a monolith application, the computer-executable instructions configured for:
- classifying a Table of a plurality of Tables associated with a database of the monolith application as an aggregate root Table, based on an analysis of each of a plurality of parameters associated with each of the plurality of Tables;
- identifying one or more dependent-Tables associated with the aggregate root Table;
- identifying one or more Functions associated with the aggregate root Table and each of the one or more dependent-Tables associated with the aggregate root Table; and
- generating a microservice by collating the aggregate root Table, the one or more dependent-Tables associated with the aggregate root Table, and the one or more Functions associated with the aggregate root Table and each of the one or more dependent-Tables associated with the aggregate root Table.

20. The non-transitory computer-readable medium of claim 19, wherein the computer-executable instructions are further configured for:
- upon generating a plurality of microservices, identifying cohesive microservices from the plurality of microservices, wherein identifying the cohesive microservices comprises:
  - identifying, from the database, relevant read queries having reference for an aggregate root Table;
  - identifying, within the relevant read queries, references for remaining of the plurality of Tables;
  - selecting one or more Tables from the plurality of Tables having corresponding references greater than a predefined threshold number of references; and
  - merging selected one or more Tables with the microservice corresponding to the aggregate root Table; and
- delete one of a Table or a Function, based on redundancy.

* * * * *